Figure 1:
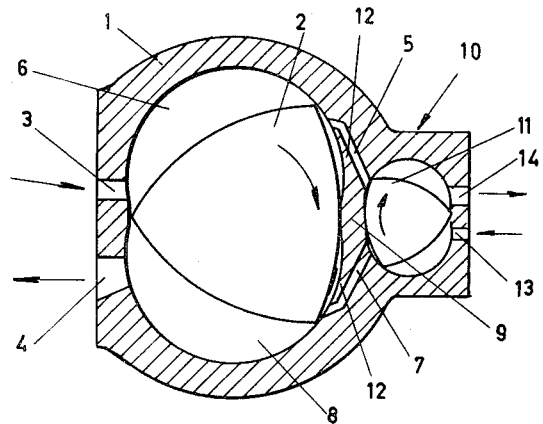

United States Patent [19]
Hubers

[11] 3,783,615
[45] Jan. 8, 1974

[54] EXPANSION ENGINE

[76] Inventor: Cornelis Hubers, Van Ostadelam 2, Rozenburg, Netherlands

[22] Filed: Oct. 29, 1971

[21] Appl. No.: 193,685

[30] Foreign Application Priority Data
Oct. 29, 1970  Netherlands.................. 7015862

[52] U.S. Cl. ........................... 60/39.61, 60/39.63
[51] Int. Cl. ............................................. F02g 1/00
[58] Field of Search .................................. 60/39.61

[56] References Cited
UNITED STATES PATENTS
3,228,183  1/1966  Feller ........................... 60/39.61 X
2,688,230  9/1954  Milliken ............................ 60/39.63
2,248,639  7/1941  Miksits ............................ 60/39.61

Primary Examiner—Clarence R. Gordon
Attorney—Stevens, Davis, Miller & Mosher

[57] ABSTRACT

An expansion engine having a motor driven by combustion gases delivered by a combustion apparatus and a control unit for the motor. The motor includes an epicycloidal piston rotatably mounted in a cylinder, an expansion chamber, an air compression chamber, an inlet for fresh air and an outlet for the exhaust gases. The control unit has an epicycloidal piston rotatably mounted in a cylinder, an inlet chamber for the combustion gases provided with an inlet channel for the combustion gases with the inlet channel being in open connection with the combustion apparatus and an air compression chamber provided with an outlet channel connected with the combustion apparatus and provided with a non-return valve. The inlet chamber and the air compression chamber of the control unit are connected by channels with the expansion chamber and the compression chamber, respectively of the motor.

2 Claims, 3 Drawing Figures

EXPANSION ENGINE

This invention relates to an expansion engine for or combined with a combustion apparatus which supplies a mixture of combustion gases under pressure, said expansion engine being characterized in that the expansion engine is constructed as a rotary piston driving engine with an epicycloidal rotary piston, comprising a control means which is likewise constructed as a rotary piston means with an epicycloidal rotary piston, both the housing of the rotary piston driving engine and the housing of the control means comprising two inlet openings and two outlet openings, at least the outlet of the control means being provided with a valve, preferably a non-return valve. In consequence of the fact that in the case of the expansion engine according to the invention the combustion takes place outside said engine in a separate combustion chamber, said combustion may be controlled such that it is substantially complete. The control of the expansion engine according to the invention is particularly simple in that the control means is constructed as a rotary piston means with a epicycloidal rotary piston. This entails the advantage that only valves or closing means need be provided in the conduits or channels through which air passes. Said valves may preferably be of the non-return valve type.

According to a preferred simple embodiment of the expansion engine according to the invention the rotary pistons of the motor and the control means may be triangular epicycloidal pistons, the compression outlet of the rotary piston motor being directly connected to the compression chamber of the control means the outlet of which communicates via a non-return valve with the combustion apparatus.

In order to increase the efficiency of the expansion engine according to the invention the compression outlet of the rotary piston motor may be connected via a conduit comprising a non-return valve with a cooler which communicates with the compression chamber of the control means.

The expansion engine according to the invention may also be of a multi-stage construction, the outlet of the expansion chamber of the first stage being in open communication with the expansion chamber of the next stage, the compression chamber of said next stage communicating via a non-return valve with a cooling chamber with buffer action, said cooling chamber being in open communication with the compression chamber of the preceding stage which via a non-return valve communicates with the combustion apparatus.

If desired the compression chamber of the preceding stage may communicate via a non-return valve with a second cooling chamber with buffer action, which is in open communication with the control means. In this way an additional increase of the efficiency can be attained.

The invention will be further explained below with reference to the drawings showing diagrammatically and by way of example two embodiments of the expansion engine according to the invention.

The drawings show in

Figure 2:
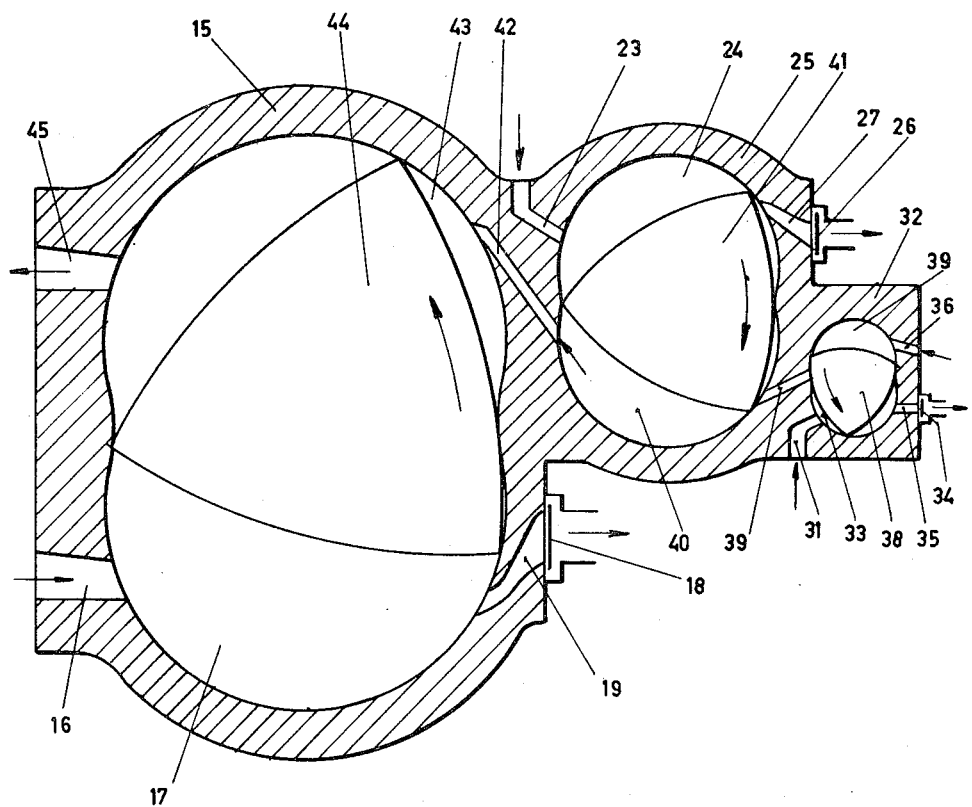

FIG. 1 a cross-section of a single stage embodiment of the ex-pansion engine according to the invention;

FIG. 2 a cross-section of a two-stage embodiment, and

Figure 3:
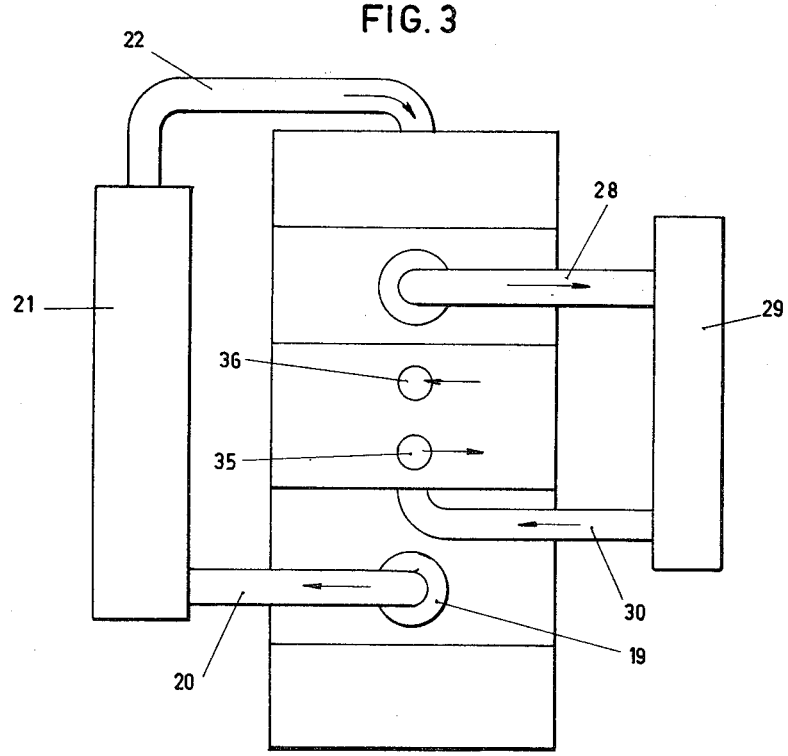

FIG. 3 a side view from left to right in FIG. 2 of said multi-stage embodiment.

The rotary piston engine shown in FIG. 1 comprises a housing 1 in which a triangular epicycloidal piston 2 can rotate clockwise. The housing 1 comprises an air inlet opening 3, an air outlet opening 4 for the expanded combustion gases, an air outlet opening for the air compressed in a chamber 6 of the housing 1 by the rotary piston 2 and an inlet opening or channel 7 for supplying hot combustion gases under pressure to a chamber 8 in which said combustion gases expand. The outlet opening 5 and the inlet opening 7 are separated from each other via a portion 9 against which the piston 2 sealingly abuts.

The outlet opening 5 and the inlet opening 7 are controlled by a control means 10 which is embodied as a rotary piston means with an epicycloidal rotary piston 11, the housing of said rotary piston means being integral with the housing 1 of the expansion engine. In a separating wall 12 which separates the rotary piston chamber of the expansion engine from the rotary piston chamber of the control means 10 there are provided the outlet opening 5 and the inlet opening 7. The housing 1 furthermore comprises an inlet opening 13 for the combustion gases opening into the chamber of the rotary piston 11 of the control means 10, said combustion gases arriving under pressure from a combustion apparatus (not shown), said inlet opening being in open communication with said combustion apparatus. The housing 1 furthermore comprises an inlet to the combustion chamber opening 14 which communicates via a valve means (not shown), for example a non-return valve, with the combustion apparatus (not shown).

The installation described above operates as follows:

The combustion gases produced in the combustion apparatus (not shown) enter via opening 13 the control means 10 and are conveyed by the rotary piston 11 of the control means 10 via the inlet opening 7 in the separating wall into an expansion chamber 8 formed by the rotary piston 2 and the housing 1 of the expansion engine. These combustion gases expand in said chamber and drive the rotary piston 2. When the rotary piston 2 has rotated so far that the outlet 4 comes into communication with the atmosphere, the expanded combustion gases escape into the atmosphere. Meanwhile the rotary piston 2 has been rotated so far that the air inlet opening 3 is released and the chamber 6, which during rotation becomes steadily larger, has filled itself with air. When the rotary piston 2 continues its rotation, the air inlet opening 3 is closed whereupon the air contained in the chamber 6 is compressed until the air outlet opening 5 is released and the air compressed in the chamber 6 flows into a chamber between the rotary piston 11 and the housing 1 of the control means 10. The chamber 6 is thereby continuously reduced and the air contained therein is thereby compressed, said air being displaced in front of the rotary piston 2. The rotary piston 11 displaces itself according to the same angle as the rotary piston 2 in the same sense of rotation so that consequently between the rotary piston 11 and the housing of the control means 10 a chamber is formed into which the compressed air is driven by the rotary piston 2 via the air outlet opening 5. When the rotary piston 11 has rotated so far that the air outlet opening 14 is released, said air is driven by the rotary piston 11 into the combustion apparatus. Meanwhile, however a second quantity of combustion gases has been supplied to the rotary piston 2, expanded and released to the atmosphere, while a second quantity of air is compressed and a third quantity of combustion gases is pressed via the inlet opening 7 by the rotary piston 11 of the control means 10 into a chamber between the rotary piston 2 and the housing 1. The afore-described cycle repeats itself therefore three times at each revolution of the rotary pistons 2 and 11.

The expansion engine shown in FIGS. 2 and 3 differs from the one according to FIG. 1 in that it is of the three-stage type. In this engine the cylinder 15 of the third stage comprises a valveless air inlet 16 opening into a chamber 17 in which the air entered therein is subjected to a first compression. The compressed air flows via an air outlet 19 provided with a non-return valve 18 via a conduit 20 to the first intermediate cooler 21 which is cooled with the aid of a cooling device (not shown). From said intermediate cooler 21 the cooled compressed air flows via a conduit 22 to a valveless air inlet 23 into a chamber 24 of the second cylinder 25 of the second stage, in which the air is subjected to a second compression. Said compressed air flows via an air outlet 27 comprising a non-return valve of said second cylinder via a conduit 28 to a second cooler 29 which is likewise cooled with the aid of a cooling device (not shown). From said second cooler 29 the air flows via a conduit 30 and the air inlet 31 of the cylinder 32 of the first stage into the chamber 33 of said cylinder in which said air is subjected to a third compression. The air which has been compressed in this way goes via an air outlet 35 provided with a non-return valve 34 to a combustion apparatus from which the combustion gases produced therein flow via a valveless inlet 36 into the filling chamber 37 of the cylinder 32 and drive the piston 38 of said cylinder. The cylinder 32 is provided with a valveless outlet 39 communicating with a chamber 40 of the second cylinder 25 in which chamber the combustion gases expand for the second time thereby driving the piston 41 of the second cylinder 25, said piston rotating in a sense contrary to the sense of rotation of the piston 38 of the first cylinder. The second cylinder 25 is connected via a channel 42 to a chamber 43 of the third cylinder 15, in which chamber the combustion gases expand for the third time thereby driving the piston 44 of said third cylinder which rotates in the same sense of rotation as the piston 38 of the first cylinder. The cylinder 15 of the third stage comprises a valveless outlet 45 through which the combustion gases flow into the atmosphere.

In the above-described instance the first stage 32, also serves as a control device. If the first stage 32 is used exclusively as an operating device the intermediate cooler 29 is cancelled. It is obvious that in that case the assembly operates as a two-stage engine. The third stage then serving as an operating device should then be provided in the same manner as the operating device 10 in FIG. 1.

It is obvious that the invention is not restricted to the embodiments described above by way of example but that many modifications may be made therein without departing from the scope of the invention, as laid down in the claims. It is, for example, also possible to supply already compressed air to the air inlet opening 3. For starting a normal starter motor may be used. However, it is also possible to use a reservoir with pressurized air for starting the motor, said reservoir being adapted to be charged again by the motor. One may also operate with an intermediate charging, and instead of non-return valves also controlled valves may be used.

What I claim is:

1. An expansion engine having a motor comprising an epicycloidal piston rotatably mounted in a cylinder and driven by combustion gases delivered by a combustion apparatus comprising a continuously operating burner arranged in a housing and having an expansion chamber and an air compression chamber said engine comprising control means for said motor, said control means having an epicycloidal piston rotatably mounted in a cylinder, the first mentioned piston and cylinder being larger than the second mentioned cylinder and piston, said control means having an inlet chamber for the combustion gases provided with an inlet channel for said combustion gases, said inlet channel being in open connection with the combustion apparatus, said control means having also an air compression chamber provided with an outlet channel connected with said combustion apparatus and provided with a non-return valve, said inlet chamber of the control means being connected by a channel with the expansion chamber of the motor, the air compression chamber of said control means being connected by a channel with the air compression chamber of the motor, said motor being provided with an inlet for fresh air and an outlet for the exhaust gases.

2. An expansion engine according to claim 1, characterized in that it is of a multi-stage construction, the outlet of the expansion chambers of each two adjacent motors are in open communication with one another, the air compression chambers of each two adjacent motors with exception of the air compression chamber of the first motor, being connected via a cooling chamber with one another, the outlet of each compression chamber being provided with a non-return valve, the outlet of the compression chamber of said first motor being connected via its non-return valve with the combustion apparatus.

* * * * *